(12) United States Patent
Newcombe (10) Patent No.: US 7,713,426 B2
(45) Date of Patent: May 11, 2010

(54) WATER TREATMENT

(75) Inventor: Remembrance L. Newcombe, Hayden, ID (US)

(73) Assignee: Blue Water Technologies, Inc., Hayden, ID (US)

( * ) Notice: Subject to any disclaimer, the term of this patent is extended or adjusted under 35 U.S.C. 154(b) by 0 days.

(21) Appl. No.: 12/013,219

(22) Filed: Jan. 11, 2008

(65) Prior Publication Data

US 2009/0178980 A1    Jul. 16, 2009

(51) Int. Cl.
*C02F 1/42* (2006.01)
*B01D 61/00* (2006.01)

(52) U.S. Cl. .................. 210/748.01; 210/670; 210/681; 210/650; 210/749; 210/748.1

(58) Field of Classification Search .................. 210/748, 210/739, 650, 670, 681, 712, 748.1, 748.01
See application file for complete search history.

(56) References Cited

U.S. PATENT DOCUMENTS

| | | | |
|---|---|---|---|
| 2,528,099 A | 10/1950 | Wilcox | |
| 2,696,462 A | 12/1954 | Bodkin | |
| 2,730,239 A | 1/1956 | Peery | |
| 2,863,829 A | 12/1958 | Henke et al. | |
| 3,056,743 A | 10/1962 | Eichhorn et al. | |
| 3,499,837 A | 3/1970 | Jaunarajs | |
| 3,537,582 A | 11/1970 | Demeter | |
| 3,619,425 A | 11/1971 | Palaiseau et al. | |
| 3,674,684 A | 7/1972 | Gollan | |
| 3,679,581 A | 7/1972 | Kunz | |
| 4,003,832 A | 1/1977 | Henderson et al. | |
| 4,049,545 A | 9/1977 | Horvath | |
| 4,126,546 A | 11/1978 | Hjelmner et al. | |
| 4,145,280 A | 3/1979 | Middlebeek et al. | |
| 4,269,716 A | 5/1981 | Gurian | |
| 4,366,128 A | 12/1982 | Weir et al. | |
| 4,842,744 A | 6/1989 | Schade | |
| 5,087,374 A | 2/1992 | Ding | |
| 5,173,194 A | 12/1992 | Hering et al. | |
| 5,190,659 A | 3/1993 | Wang et al. | |
| 5,236,595 A | 8/1993 | Wang et al. | |
| 5,302,356 A * | 4/1994 | Shadman et al. ......... | 422/186.3 |
| 5,369,072 A | 11/1994 | Benjamin et al. | |
| 5,372,720 A | 12/1994 | Jonsson | |
| 5,439,595 A * | 8/1995 | Downey, Jr. ................. | 210/748 |
| 5,443,729 A | 8/1995 | Sly et al. | |

(Continued)

FOREIGN PATENT DOCUMENTS

DE        2724254        11/1978

(Continued)

OTHER PUBLICATIONS

Wouter, "Effluent polishing at Sewage Works Ruurlo and Wehl, the Netherlands", *Translated from H2O*, 1-3.

(Continued)

*Primary Examiner*—Walter D Griffin
*Assistant Examiner*—Cameron J Allen (57) ABSTRACT

Exemplary systems and methods relating to water treatment are described. One implementation filters water through a moving bed media filter sufficient to decrease the water's turbidity. This implementation simultaneously disinfects the filtered water and at least a portion of the moving bed media filter with ultra violet (UV) energy.

4 Claims, 6 Drawing Sheets

U.S. PATENT DOCUMENTS

| | | | |
|---|---|---|---|
| 5,454,959 A | 10/1995 | Stevens | |
| 5,534,153 A | 7/1996 | Scott et al. | |
| 5,573,666 A * | 11/1996 | Korin | 210/232 |
| 5,670,046 A | 9/1997 | Kimmel | |
| 5,679,257 A | 10/1997 | Coate et al. | |
| 5,707,528 A | 1/1998 | Berry | |
| 5,746,913 A | 5/1998 | Chang et al. | |
| 5,755,977 A | 5/1998 | Gurol et al. | |
| 5,843,308 A | 12/1998 | Suozzo et al. | |
| 5,855,787 A | 1/1999 | Gioro | |
| 5,876,606 A | 3/1999 | Blowes et al. | |
| 5,911,882 A | 6/1999 | Benjamin et al. | |
| 6,077,446 A | 6/2000 | Steiner et al. | |
| 6,132,623 A | 10/2000 | Nikolaidis et al. | |
| 6,143,186 A | 11/2000 | Van Unen | |
| 6,200,482 B1 | 3/2001 | Winchester et al. | |
| 6,217,765 B1 | 4/2001 | Yamasaki et al. | |
| 6,334,956 B1 | 1/2002 | Hanemaaijer | |
| 6,426,005 B1 | 7/2002 | Larsson | |
| 6,432,312 B1 | 8/2002 | Fuss | |
| 6,464,877 B1 | 10/2002 | Mori et al. | |
| 6,468,942 B1 | 10/2002 | Sansalone | |
| 6,471,857 B1 | 10/2002 | Kaibara | |
| 6,630,071 B1 | 10/2003 | Buisman et al. | |
| 6,663,781 B1 | 12/2003 | Huling et al. | |
| 6,716,344 B1 | 4/2004 | Bassi et al. | |
| 6,942,786 B1 | 9/2005 | Fosseng | |
| 6,942,807 B1 | 9/2005 | Meng et al. | |
| 7,029,589 B2 | 4/2006 | McGinness | |
| 2001/0052495 A1 | 12/2001 | Friot | |
| 2002/0003116 A1 | 1/2002 | Golden | |
| 2004/0144728 A1 | 7/2004 | Moller et al. | |
| 2005/0127003 A1 | 6/2005 | Dennis | |
| 2005/0173348 A1 | 8/2005 | Drake | |
| 2005/0263447 A1 * | 12/2005 | McGrew | 210/205 |
| 2006/0000784 A1 | 1/2006 | Khudenko | |
| 2006/0000785 A1 | 1/2006 | Moller | |
| 2007/0136919 P1 | 6/2007 | Bak et al. | |
| 2007/0187329 A1 * | 8/2007 | Moller et al. | 210/670 |

FOREIGN PATENT DOCUMENTS

| | | |
|---|---|---|
| GB | 471277 | 9/1937 |
| GB | 1596205 | 8/1981 |
| JP | 03137990 | 6/1991 |
| JP | 7-232161 | 5/1995 |
| JP | 20010070954 | 3/2001 |
| JP | 2002-159977 | 4/2002 |
| WO | WO 0110786 A1 * | 2/2001 |
| WO | WO2004050561 | 6/2004 |

OTHER PUBLICATIONS

Beltran, Fernando J., "Ozone Reaction Kinetics for Water and Wastewater Systems", *Heterogeneous Catalytic Ozonation, Chapter 10, Lewis Publishers*, 2004, pp. 227-276, 227-276.

Ravikumar, et al., "Chemical Oxidation of Chlorinated Organics by Hydrogen Peroxide in the Presence of Sand", *Environ. Sci. Technol.*, 1994, 28, pp. 394-400, 394-400.

Pestovsky, Oleg et al., "Aqueous Ferryl(IV) Ion: Kinetics of Oxygen Atom Transfer to Substrates and Oxo Exchange with Solvent water", *Inorganic Chemistry Article; Inorg. Chem. 2006*, 45, 814-820, (Oct. 27, 2005),pp. 814-820.

Newcombe, R.L. et al., "Phosphorus Removal from Municipal Wastewater by Hydrous Ferric Oxide Reactive Filtration and Coupled Chemically Enhanced Secondary Treatment: Part 1—Performance", (Mar. 1, 2008),pp. 1-9.

Smith, S. et al., "The Significance of Chemical Phosphorus Removal Theory for Engineering Practice", (2007),pp. 1-24.

Newcombe, R. L., et al., "Phosphorus Removal from Municipal Wastewater by Hydrous Ferric Oxide Reactive Filtration and Coupled Chemically Enhanced Secondary Treatment: Part II—Mechanism", (Mar. 1, 2008).

Arai, Y. et al., "ATR-FTIR Spectroscopic Investigation on Phosphate Adsorption Mechanisms at the Ferrihydrite-Water Interface", *J. Colloid Interface Sci.* Retrieved from http://ag.udel.edu/soilchem/arai01bjcis.pdf 2001, pp. 241, 317-326.

Benjamin, Mark M. et al., "Sorption and Filtration of Metals Using Iron-Oxide-Coated Sand", May 1, 1996, pp. 1-13.

Gustafsson, John P., "Modelling Molybdate and Tungstate Adsorption to Ferrihydrite", *Chemical Geology - vol. 200, Issues 1-2, Oct. 16, 2003* Retrieved from <<http://www.sciencedirect.com/science?_ob=ArticleURL&_udi=B6V5Y-48TMHH4-3&_user=10&_rdoc=1&_fmt=&_orig=search&_sort=d&_docanchor=&view=c&_searchStrId=1066144960&_rerunOrigin=google&_acct=C000050221&_version=1&_urlVersion=0&_userid=10&md5=3a Jul. 11, 2003, pp. 105-115.

Gustafsson, John P., "Visual MINTEQ. MINTEQA2 4.0", *Royal Institution of Technology Land and Water Resources Engineering; Stockholm, Sweden* 2006.

International Organization for, Standardization, "Water Quality - Determination of Nitrogen - Part 2: Determination of Bound Nitrogen, After Combustion and Oxidation to Nitrogen Dioxide, Chemiluminescence Detection", *ISOm 11905-2; Geneva, Switzerland* Retrieved from <<http://www.saiglobal.com/PDFTemp/Previews/OSH/ISO/ISO_12345_03-01/T023630E.PDF>> Mar. 15, 1997, pp. 1-5.

Ivanov, V. et al., "Phosphate Removal from the Returned Liquor of Municipal Wastewater Treatment Plant Using Iron-Reducing Bacteria", *J. Appl. Microbiol* 2005, pp. 98, 1152-1161.

Jenkins, D., "Chemical Processes for Phosphate Removal", *Water Res.* Retrieved from <<http://books.google.com/books?id=bBSRPv87Ms8C&pg=PA94&lpg=PA94&dq=%22chemical+processes+for+phosphate+removal%22&source=bl&ots=kVPUAz08Jp&sig=keK-5nOkxZZdx4itR2_Jd_YNcfE&hl=en&ei=gF7nSsCCLpCMtAPEz9iIBQ&sa=X&oi=book_result&ct=result&resnum= 1991, pp. 5, 369-387.

Joshi, Arun et al., "Removal of Arsenic from Ground Water by Iron Oxide-Coated Sand", Aug. 1, 1996, pp. 1-4.

Khare, N. et al., "Xanes Determination of Adsorbed Phosphate Distribution between Ferrihydrite and Boehmite in Mixtures", *Published in Soil Sci. Soc. Am. J.* 68:460-469 (2004). Retrieved from <<http://soil.scijournals.org/cgi/content/abstract/68/2/460>> 2004, pp. 68, 460-469.

Leaf, William et al., "Evaluation of Blue PRO Process at the Hayden Wastewater Research Facility - Final Summary Report No. 331243.01.RP", *CH2M Hill; Denver, Co, July* Retrieved from <<http://cforjustice.org/wp-content/uploads/2008/12/hayden-3rd-party-blue-pro-report.pdf>> Jul. 12, 2006, pp. 1-21.

Lo, Shang-Lien et al., "Characteristics and Adsorption Properties of Iron-Coated San", , pp. 1-9.

Lovley, Derek. R. et al., "Organic Matter Mineralization with Reduction of Ferric Iron in Anaerobic Sediments", *Applied and Environmental Microbiology*, Apr. 1986 Retrieved from <<http://www.ncbi.nlm.nih.gov/pmc/articles/PMC238947/pdf/aem00139-0019.pdf>> Apr. 1986, pp. 51, 683-689.

Matott, L. S., "IsoFit Version 1.0", *State University of New York at Buffalo* 2004.

Meima, J. A. et al., "Application of Surface Complexation/Precipitation Modeling to Contaminant Leaching from Weathered Municipal Solid Waste Incinerator Bottom Ash", *Environ. Sci. Technol.* 1998, pp. 32, 688-693.

Newcombe, R. L. et al., "Arsenic Removal from Drinking Water by Moving Bed Active Filtration", *J. Environ. Eng.* 2006, pp. 132, 5-12.

Nowack, Bernd et al., "Modeling the Adsorption of Metal-EDTA

Complexes onto Oxides", *Environ. Sci. Technol*. Retrieved from <<http://www.empa.ch/plugin/template/empa/*/78480/---/I=2>> 1996, pp. 30, 2397-2405.

Parfitt, R. L. et al., "The Mechanism of Phosphate Gixation by Iron Oxides", *Soil Sci. Soc. Am. Proc*. 1975, pp. 39, 837-841.

Parker, Denny S. et al., "The Future of Chemically Enhanced Primary Treatment: Evolution Not Revolution", Retrieved from <<http://www.cd3wd.com/cd3wd_40/ASDB_SMARTSAN/CEPT-Debate-2.pdf>> Mar. 15, 2001.

Schwertman, U. et al., "Iron Oxides in the Laboratory: Preparation and Characterization", *Wiley-VCH: Weinheim, Hermany* 2000.

Sigg, L. et al., "The Interaction of Anions and Weak Acids with the Hydrous Goethite Surface", *Colloids Surf*. 1980, pp. 2, 101-107.

Stabnikov, V. P. et al., "Effect of Iron Hydroxide on Phosphate Removal During Anaerobic Digestion of Activated Sludge", *Appl. Biochem. Microbiol*. 2004, pp. 40, 376-380.

Thirunavukkarasu, O. S. et al., "Removal of Arsenic in Drinking Water by Iron Oxide-Coated Sand and Ferrihydrite - Batch Studies", , pp. 1-17.

Dzombak, D. A. et al., *Surface ComDlexation Modeling*, 1990; John Wiley & Sons; New York, NY.

Hermanowicz, S. W., "Chemical Phosphorus Removal", *Biological and Chemical Systems for Nutrient Removal; Water Environment Federation: Alexandria, Virginia, 39*. 2005, p. 39.

* cited by examiner

FIG. 6 ced air to an orifice(s) 116 that can
WATER TREATMENT

BRIEF DESCRIPTION OF THE DRAWINGS

The accompanying drawings illustrate implementations of the present application. Features and advantages of the illustrated implementations can be more readily understood by reference to the following description taken in conjunction with the accompanying drawings.

Like reference numbers and designations in the various drawings are used wherever feasible to indicate like elements.

DETAILED DESCRIPTION

Overview

The present implementations relate to processing or treating fluids, such as water. The water processing can decrease contaminant and/or solids levels in the water and/or can disinfect the water. Moving bed media filtration processes can be utilized to decrease solid loads in water, decrease contaminant loads in the water, and/or disinfect the water. Ultra violet (UV) energy processing can also be utilized to disinfect water. However, the effectiveness of UV energy for disinfection is greatly diminished by relatively high water turbidity caused by the contaminants and/or solids. Accordingly, water disinfection can be enhanced by utilizing UV processing after a moving bed filtration process which can lower the turbidity. Further, in some instances, the UV process can reciprocally enhance the functionality of the moving bed media filtration process. In such configurations, the results of the combined system can be greater than would be expected from the two processes considered individually.

Exemplary Water Processing Systems

FIGS. 1-4 illustrate examples of water processing systems that advantageously combine moving-bed media filtration and ultra violet (UV) treatment.

Figure 1:
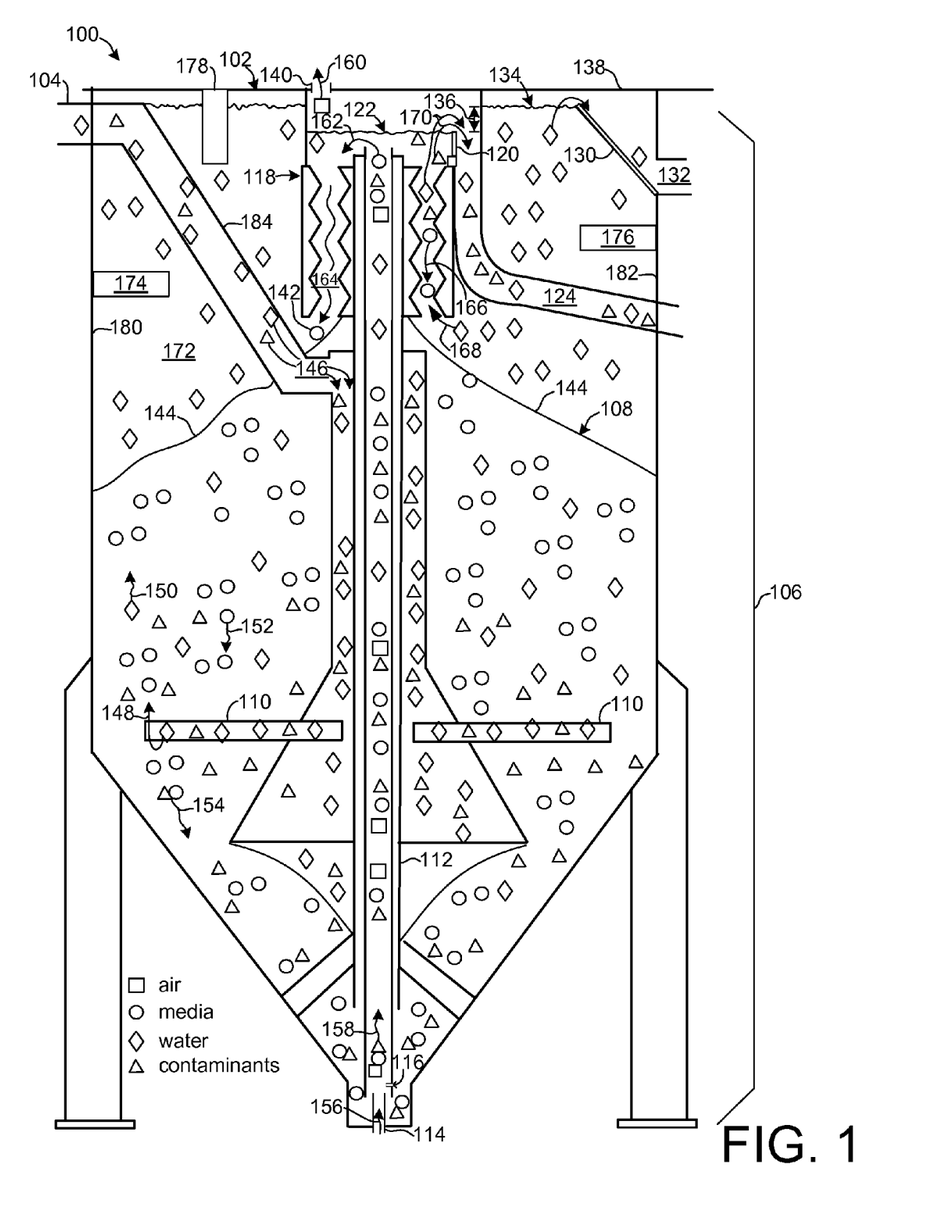
FIGS. 1-5 illustrate water treatment systems in accordance with some implementations of the present concepts.

FIG. 1 illustrates an example of a water treatment system 100, which includes a vessel 102 that receives contaminated water for treatment through an inlet pipe 104. As depicted in FIG. 1, water is represented by a diamond symbol "◊" while contaminants are represented by a triangle symbol "Δ". The received water can alternatively or additionally contain various solids which are discussed below.

In this implementation, vessel 102 includes a filter chamber 106 that contains a media bed 108 with individual media represented by a circle symbol "○". In this manifestation, inlet pipe 104 extends down into filter chamber 106 to discharge the contaminated water into a central portion of media bed 108 through a distribution mechanism. In this instance, the distribution mechanism is in a form factor of a perforated manifold 110.

In this case, a recirculation or airlift tube 112 generally extends from the bottom to the top of filter chamber 106 at the center of vessel 102. An orifice 114 positioned below airlift tube 112 allows compressed air to be supplied to vessel 102. As depicted in FIG. 1 air is represented by a square symbol "□". Orifice 114 can be positioned so that released compressed air tends to travel up into the recirculation tube 112 rather than outside of the recirculation tube and into media bed 108. In an alternative configuration, compressed air can be supplied via a conduit (not shown) that runs down through the vessel generally coextensive to airlift tube 112. The conduit provides the compressed air to an orifice(s) 116 that can release the compressed air into, or proximate to, the airlift tube 112. In either scenario, the released air rises within the airlift tube 112 to its upper end which is proximate to a washbox 118.

In this case, washbox 118 includes a water control mechanism in the form of a weir 120. The weir 120 can control a water level 122 above the washbox. The washbox 118 can function to break-up any clumps of media that enter the washbox and/or to further separate solids and/or contaminants from the media. A waste stream outlet 124 carries the separated solids and/or contaminants from the vessel 102. System 100 can also include a water control mechanism in the form of a weir 130 for controlling outflow of filtered water via an outlet 132. Stated another way, weir 130 defines a water level 134 of the filter chamber 106 excluding the water level 122 controlled by weir 120. A head pressure or difference 136 between the washbox water level 122 and the filter chamber water level 134 can cause water to flow upward from filter chamber 106 through the washbox 118.

In this instance, vessel 102 includes an upper or top member 138 that seals the vessel and a gas outlet 140 positioned in the top member 138. In other implementations, vessel 102 does not include a top member and is directly open to the atmosphere.

To summarize, the media bed 108 utilizes media to separate or filter solids and/or contaminants from the inflowing water. The washbox 118 then utilizes a relatively small percentage of the filtered water to clean the media by separating the solids and/or contaminants from the media. The cleaned media 142 falls through the filtered water onto an upper surface 144 of media bed 108. In this manner the media is cleaned and recycled for further use in the media bed.

In operation, contaminated water enters vessel 102 via inlet pipe 104. The contaminated water passes downward through the inlet pipe as indicated by arrows 146. The contaminated water flows from the inlet pipe and into perforated manifold 110. The contaminated water exits the perforated manifold into media bed 108 as indicated by arrow 148. A majority of the water flows upward through the media bed as indicated by arrow 150 while media moves downward as indicated by arrow 152. Contaminants and/or solids tend to be retained in the media bed and carried downward with the media as indicated by arrow 154. Water treatment system 100 is an "upflow" system meaning the water released from manifold 110 generally flows upward. However, the concepts described herein can be employed with a "downflow" system and/or other systems.

Continuing with the above explanation, compressed air supplied to vessel 102 via orifice 114 forms air bubbles that are less dense than the surrounding media and water. The air bubbles rise upwardly as indicated by arrow 156 and carry media, contaminants, and/or solids upwardly into recirculation tube 112 as indicated by arrow 158. A scouring action occurs as the air bubbles, media, contaminants, and/or solids rise up the recirculation tube. The scouring action tends to cause the contaminants and/or solids to be dislodged and/or separated from the media. Upon arrival at the top of the recirculation tube, the air bubbles tend to rise up and leave the vessel through the gas outlet 140 as indicated by arrow 160. The media is relatively dense and tends to fall down around the mouth of the recirculation tube and into the washbox 118 as indicated by arrow 162.

Contaminants and/or solids tend to be less dense than the media and as such tend to be lifted by the water flow through washbox 118. Some of the contaminants and/or solids may still be in some way attached to, or associated with, the media and as such tend to be carried downward with the media into the washbox. The washbox can function to break up clumps of media and/or to separate contaminants and/or solids from the media. In this case the washbox defines a tortuous pathway as indicated by arrow 164. The relatively dense media falls downward along tortuous pathway 164 as indicated by arrow 166. Because of head pressure 136, water tends to flow upwardly from the filter chamber 106 along tortuous pathway 164 as indicated by arrow 168. Accordingly, the water creates a counter-current flow to the descent of the media. Functionally, the counter-current flow and/or interactions of the descending media with washbox surfaces defining the tortuous pathway 164 can cause clumps of media to be broken up and contaminants and/or solids to be carried upwardly with the water. Water, contaminants and/or solids flow over weir 120 as indicated by arrows 170 to form a waste stream that is removed via waste stream outlet 124.

This implementation can also be thought of as counter-current in that as water moves up (arrow 150) though the media bed 108 the water encounters ever cleaner media since the media is moving in the opposite or downward direction (arrow 152). This process culminates when the water encounters just cleaned media 142 as the now filtered water passes through the media bed's upper surface 144 into region 172. This region can be thought of as defining a volume occupied by filtered water before the filtered water either travels up into washbox 118 as indicated at 168 or into outlet 132. Due to the above described filtration process, the filtered water in region 172 can have greatly decreased turbidity and contaminant loading when compared to the contaminated water received by the system 100 at inlet pipe 104.

In this implementation, water treatment system 100 can further include one or more energy sources such as electromagnetic sources and/or ultrasound sources. Examples of electromagnetic sources can include UV sources. Examples of ultrasound energy sources can include hydrodynamic or cavitation sources. In this case, system 100 includes three UV sources 174, 176, and 178. UV energy can be an effective disinfectant of water. However, the effectiveness of UV energy is greatly diminished by relatively high water turbidity. Stated another way, UV effectiveness is greater where the water has a relatively high transmissity than where the water has a relatively low transmissity.

Accordingly, supplying UV energy to the filtered water of system 100 greatly enhances the UV energy's ability to disinfect the water. Further, in this case, the UV energy can also prevent or decrease biological organisms from colonizing vessel surfaces in region 172. For instance, UV energy from one or more of UV sources 174-178 can strike surfaces, such as surfaces 180, 182 and 184 to prevent biological growth thereon. Further, the UV energy can strike the cleaned media as it falls from the washbox 118 and/or on surface 144 to limit and/or prevent the growth of organisms on the media.

In summary, filter chamber 106 produces filtered water that can be more effectively disinfected with UV energy than would otherwise be possible. Also, by exposing the filtered water to the UV energy in region 172 the UV energy can assist in cleaning the media of the filter chamber. Accordingly, better results can be obtained with this implementation than could be expected with either the filter chamber's filtration process or the UV sources' disinfection process alone. Further, this implementation can provide better results than can be obtained utilizing both processes in isolation for at least the reasons described above.

Another potential advantage of the implementations described in relation to water treatment system 100 can be decreased down time compared to other configurations. For instance, water treatment system 100 can filter contaminants from water, disinfect the water, and limit organisms from growing in the system which could otherwise necessitate occasional system shutdowns to remove built-up organisms. In other systems that filter water with a first system and then send the water to a second system for UV treatment, the first system may suffer from a relatively high amount of down time where the system has to be shutdown and cleaned to remove a build-up of organisms in the filtration system. These other systems can alternatively or additionally suffer from decreased efficacy where the organisms interfere with treatment such as by coating media surfaces. In contrast, the water treatment system of FIG. 1 can decrease and/or eliminate such down times and/or increase relative media surfaces available in the moving bed media filtration process.

The concepts described in relation to water treatment system 100 can also lend themselves to testing a design under controlled conditions. One or more units can then be built consistent with the tested design. For instance, the power and/or the location of the UV sources can be tested to ensure both adequate water disinfection and organism inhibition on the vessel. For instance, the UV sources can be positioned to avoid "shadow regions" which do not receive sufficient UV energy to inhibit biological growth. In another example, the power of UV energy delivered to the treated water can be established based upon the flow rate of treated water from the filter chamber to ensure adequate exposure for disinfecting the water.

Further, in some instances, a control system or unit (not specifically designated) can be utilized to inter-relate UV energy delivery and the filtration process based upon one or more operating parameters. For example, the control system could monitor the water received for treatment. In an instance where the received water has a relatively low solids and/or contaminate loading, the control system may increase the flow rate through the vessel 102. In such an instance, the control system may increase the output of the UV source(s) due to a decreased exposure time of the filtered water in the region 172. In another configuration, the control unit may activate wipers on the UV sources at a frequency based upon parameters of the filtered water. For instance, the control unit may increase wiping frequency in response to increased contaminant and/or reagent concentrations in the filtered water. An increased wiping frequency can decrease build-up of these materials that may settle on the UV sources. Thus the increased wiping frequency serves to maintain UV energy transmission at expected levels. The skilled artisan should recognize other configurations.

Once the testing is completed, multiple units can be built based upon the tested configuration to take advantage of economies of scale. Such units tend to be more performant, economical, and/or reliable than custom field-built systems. The skilled artisan should recognize that the above described concepts can lend themselves to manufacturing self-contained units that contain both the filtration chamber and the UV sources. Such self contained units can offer a price and/or performance advantage over custom-built installations.

Figure 2:
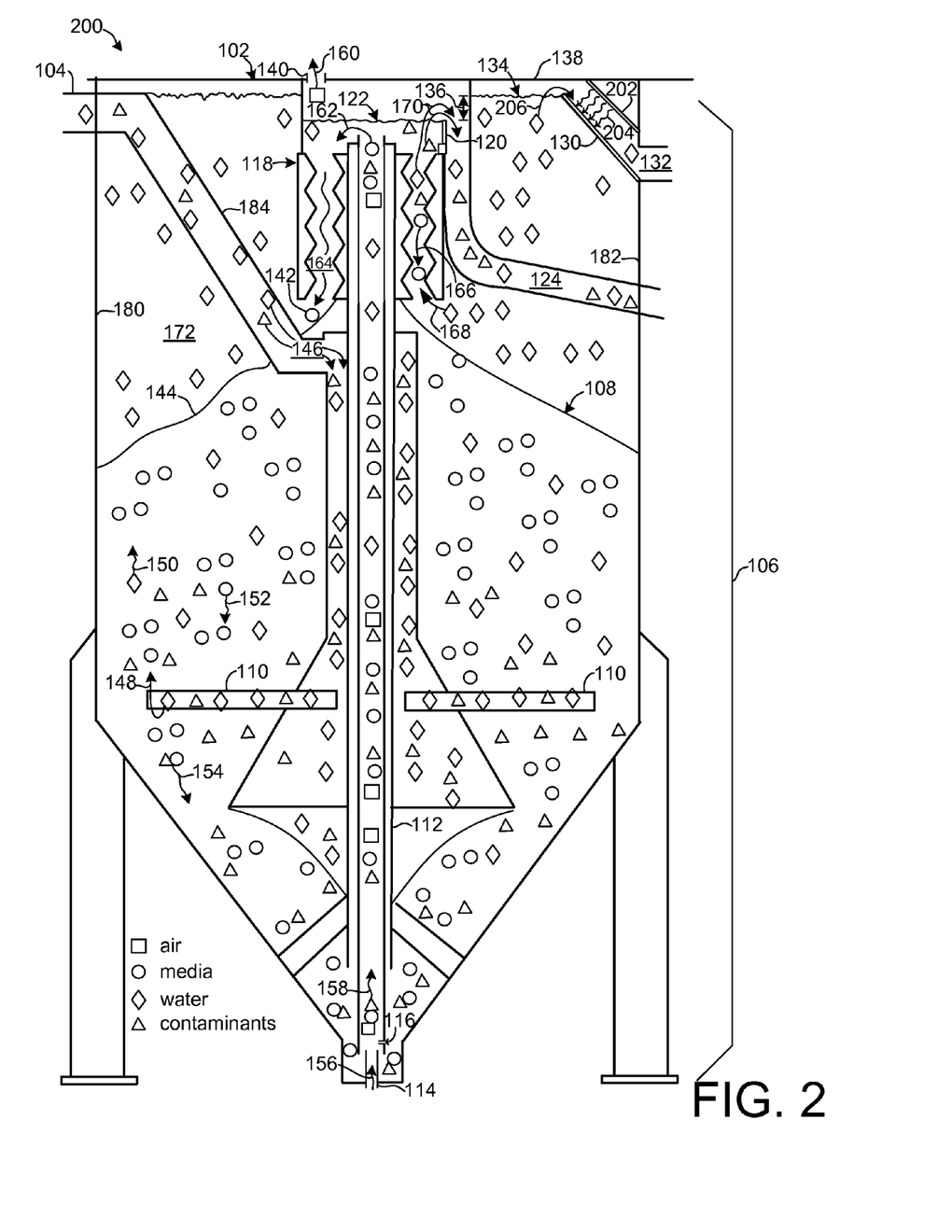

FIG. 2 offers an alternative configuration of a water treatment system 200 that is similar to that of FIG. 1 except that no UV energy sources are positioned within region 172 or in a manner to deliver UV energy into region 172. In water treatment system 200, a UV source 202 can be integral to the system and can be positioned within vessel 102. However, UV source 202 can be configured to only deliver UV energy 204 to filtered water 206 flowing down weir 130. In this configuration, the UV energy can disinfect the effluent water without limiting biological growth within other portions of vessel 102. This configuration can be useful for instances where organisms are utilized within the vessel to remove contaminants. For instance, organisms can be employed in order to remove nitrogen contaminants from the water in vessel 102. The configuration of water treatment system 200 can allow biological organisms to flourish in the vessel (or parts thereof) while disinfecting the effluent water. Further, water treatment system 200 can offer both filtration and disinfection processes in a single integrated system.

Figure 3:
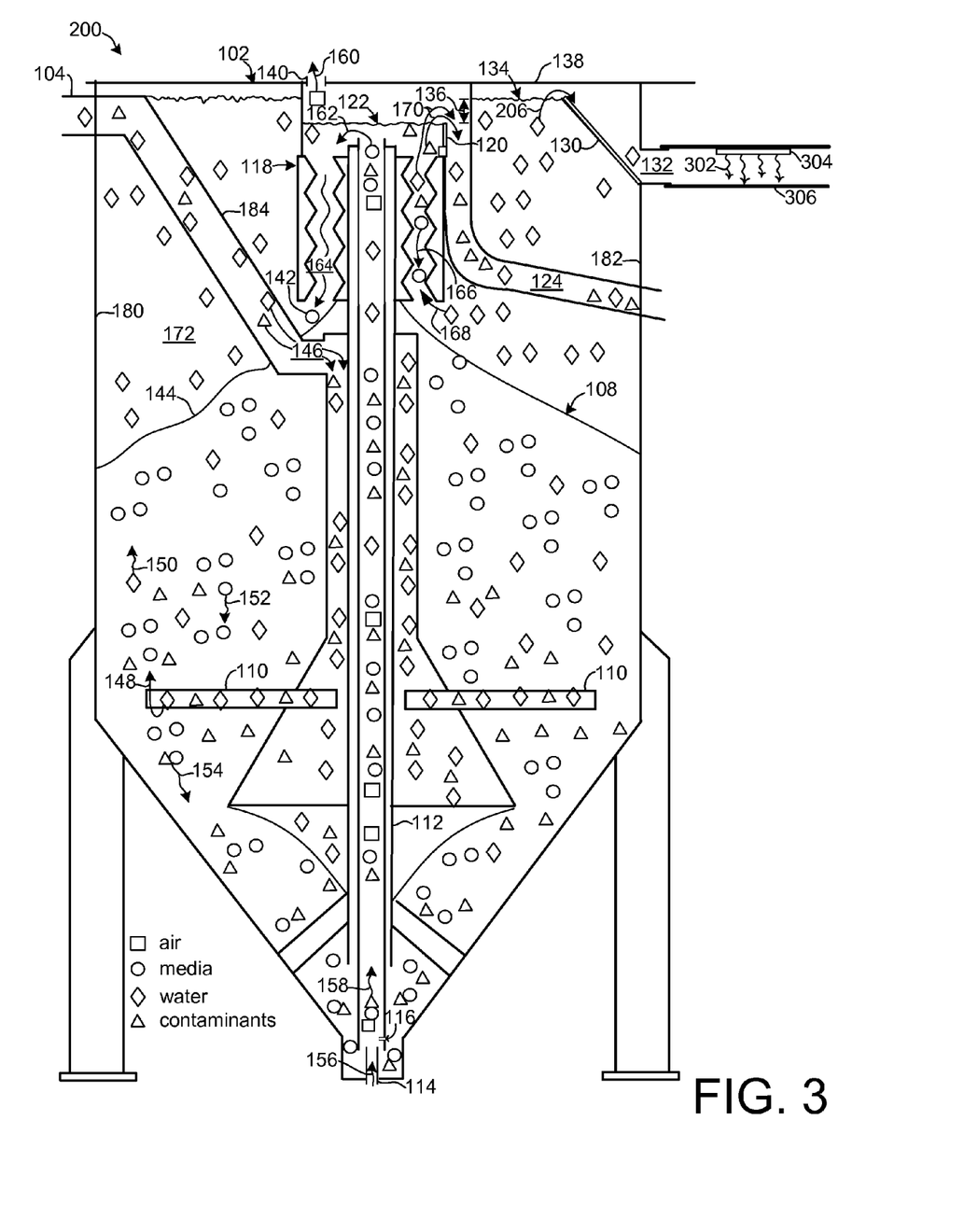

FIG. 3 offers still another configuration involving a water treatment system 300 where UV energy 302 can be delivered to the effluent water after the effluent water leaves vessel 102. In this case, a UV source 304 is positioned proximate an effluent pipe or trough 306 that is connected to vessel 102 to receive water therefrom. In this configuration, the effectiveness of the UV energy at disinfecting the water can be greater than could be achieved without the associated media bed filtration process.

Figure 4:
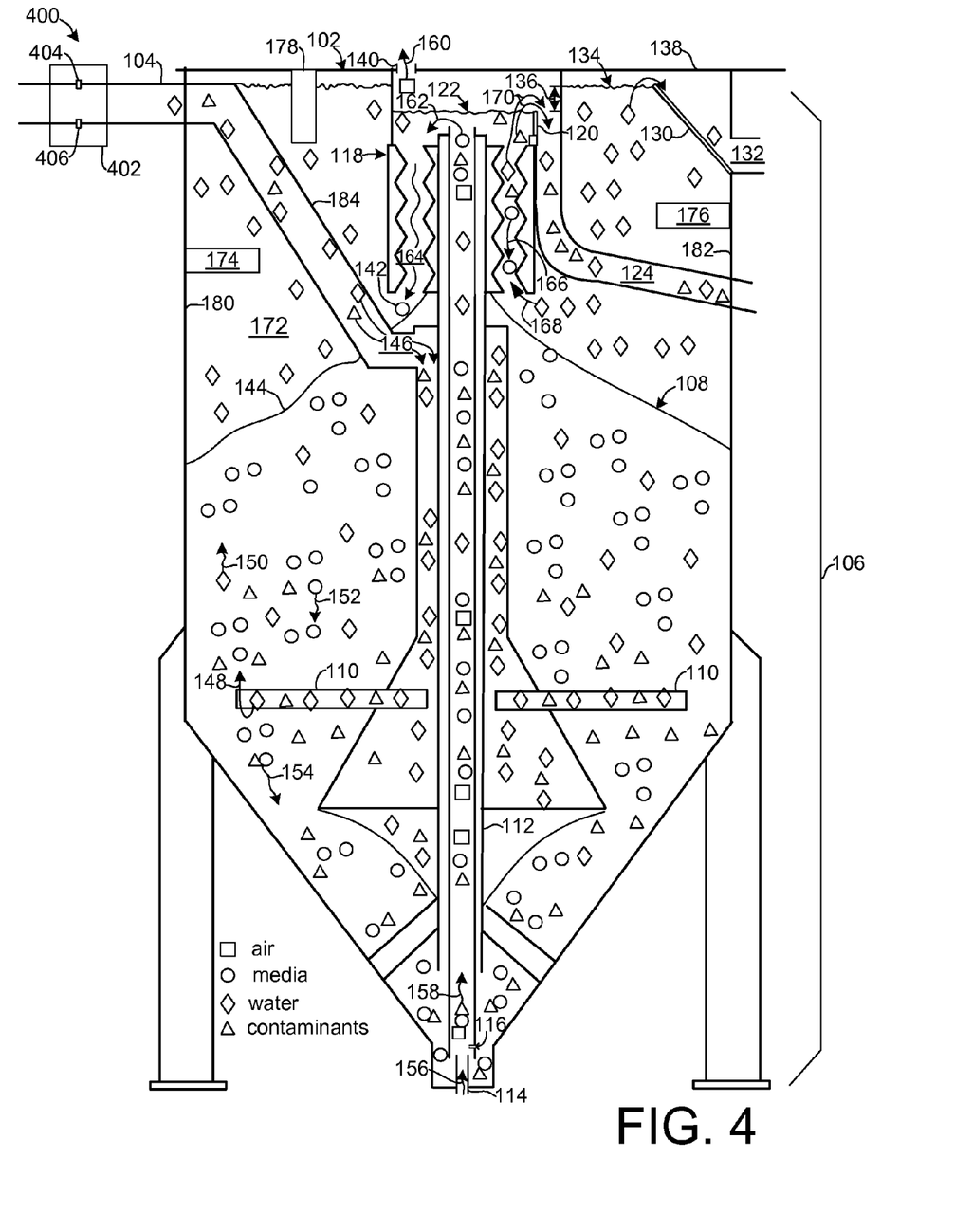

FIG. 4 shows a further configuration involving a water treatment system 400. In this case, the structure of water treatment system 400 is similar to the structure of water treatment system 100 described above, with the addition of a matter introduction mechanism 402. The matter introduction mechanism is connected to inlet pipe 104 that supplies water for treatment or processing by vessel 102. Matter introduction mechanism 402 allows one or more types of matter to be added to the received water to facilitate water processing. For instance, types of matter that can be introduced can include various reagents, such as metal salts, and/or various oxidizing agents, such as hydrogen peroxide or ozone, among others. The skilled artisan should recognize other types of matter that can be added to the received water to aid in purification. The matter introduction mechanism can include one or more ports or other mechanisms for controllably introducing matter into the received water. In this case, matter introduction mechanism 402 includes two ports 404, 406.

In some instances, the matter introduction mechanism 402 can include mechanism(s) to facilitate mixing and/or interactions between the received water and the introduced matter. For instance, various stirring or energizing mechanisms can be employed. Alternatively or additionally, mechanisms can be employed to extend a duration that the received water is exposed to the introduced matter before reaching vessel 102. In one such case, serpentine piping can be employed to increase both the duration and extent of interaction between the added matter and the received water prior to entering media bed 106.

Water treatment system 400 lends itself to creating reactive filter media within filter chamber 106. A reactive filter media is any filter media with the additional capability of removing contaminants from wastewater through chemical processes such as adsorption. A reactive filter media tends to screen contaminants from the water and the reactive surfaces of the media adsorb contaminants from the water. Reagents, such as metal salts, tend to interact with the media surfaces to create the reactive filter media to which contaminants can interact. The media surfaces can be cleaned in the airlift tube 112 and washbox 118 and regenerated upon exposure to additional reagent in the media bed 108. In these instances, additional reagent can be continuously or periodically added to the received water to regenerate the reactive filter media.

In some implementations, matter introduction mechanism 402 can be utilized to add the reagents to the received water to create reactive surfaces on the filter media. In some instances, soluble forms of manganese, aluminum, or other metals such as zinc and copper can provide suitable reagents. Iron is often used as the reagent due to its proven reactivity with a variety of contaminants and its current widespread use in water treatment. Ferric chloride, for example, is a potential reagent when phosphorus or arsenic is the target contaminant. In any particular water targeted for treatment there may be alternate and competitive reactive pathways for the added active reagents. These pathways will be the result of the specific water chemistry in the wastewater. For example, wastewater with high levels of dissolved carbonate or phosphate can react with added reagents in competition to the target contaminant such as arsenic.

In another implementation, rather than adding metal salt reagents, metal granules can be added to media bed 108 to provide a solid phase reactive surface of corroding metal as well as a source of dissolved metal. For instance, where iron granules or filings are employed, the filings act as a source of dissolved iron, such as salts of Fe(II) and Fe(III), that react with the media in the media bed to create reactive iron oxide coated media and/or other iron containing compounds that interact with the contaminants. The strongly reducing nature of water solutions with iron metal and media mixtures can be useful for chemical reactions, such as the reductive degradation of organic solvents dissolved in contaminated water.

Some implementations can attempt to optimize the reagent dose added via matter introduction mechanism 402 to ensure near complete solution, reaction, and saturation of all of the competing reactive pathways and to allow for residual metal in the solution to react with the media bed. For instance, in the case of phosphorus, ferric chloride can be employed as the metal salt reagent. The iron can react with the surface of the media to form iron oxide coated media and/or hydrous ferric coated media, among other compounds. Iron oxide coated media and/or hydrous ferric coated media can provide a stationary phase removal pathway for water borne contaminants such as phosphorus and arsenic. Contaminants in the wastewater are exposed as a "mobile" phase over the "stationary" (slowly moving) iron oxide coated media and/or hydrous ferric coated media bed for high efficiency sorptive and ion exchange removal. The physical action of the moving media can abrade the surface of the media, regenerating active sites for additional iron salt and water contaminant reactions. Hence, regenerated reactive sites for contaminant binding are continually presented to the flowing water. Abraded media-iron-contaminant solids tend to be removed by the screen filtering action of the media bed. The treated water can exit the media filter bed with contaminants substantially removed. Some amount of contaminants and/or reagents can remain in the filtered water that enters region 172.

The discussion above relating to FIGS. 1-3 introduces the concept of utilizing UV energy to disinfect the filtered water. In the present case, the UV energy can alternatively or additionally increase a rate of reaction of any remaining contaminants and reagents. Accordingly, supplying UV energy to the filtered water can further decrease contaminant concentrations below those obtained with the reactive filtration process as well as disinfecting the filtered water. Further, as noted above in the discussion relating to FIG. 1, the UV energy can inhibit biological growth on media surfaces. Inhibiting biological growth on the media surfaces can allow more surfaces to be available for the reactive filtration process. For instance, surfaces that are free of biological growth are more likely to react to form iron oxide coated media and/or hydrous ferric coated media in the above example.

Alternatively or additionally to adding reagents, system 400 can employ an oxidation process to aid in treatment of the received water. An oxidizing agent (e.g., oxidizer or oxidant), such as ozone gas ($O_3$) or hydrogen peroxide ($H_2O_2$), can be mixed with the water before, or while, the water passes through media bed 108. For instance, the oxidizing agent can be added via port 404 or 406. In one such example, ozone can be added as the oxidizing agent to create ozonized water for delivery to the media bed. The oxidizing agent can perform various functions in the media bed. For instance, when utilized without other reagents, the oxidizing agents can serve to oxidize contaminants and organisms in the water for removal in the filter bed 108. In another scenario, when used in combination with the metal reagents mentioned above, the oxidizing agent can contribute to formation of catalytic, oxidizing filter media that removes contaminants by filtering and by oxidation.

In the latter case, implementations of the process can create and utilize a renewable, catalytic, oxidizing filter media that removes contaminants by filtering and by oxidation. Relatively high amounts of ozone may be introduced into the received water in order to ensure high levels of contaminant oxidation and removal in the media bed. In such cases, some residual ozone may remain in the filtered water that reaches region 172. Previously, this residual ozone may have required special handling equipment. For instance, equipment may be utilized to capture and vent the residual ozone that off-gases from the filtered water. In system 400, such equipment can include lid 138 to contain the off-gassed residual ozone and gas outlet 140 which can be vented to a suitable exhaust location.

Accordingly, in previous water treatment systems, residual ozone in the filtered water could result in increased cost and complexity. In contrast, the present concepts can allow any excess ozone to be utilized constructively thereby diminishing any ozone handling considerations. In this case, the UV energy supplied by UV sources 174-178 can energize the residual ozone to form multiple destructive pathways. For instance, the energized ozone can be converted into reactive oxidants, including superoxide, hydroxyl radicals, and/or peroxide, that can more readily react with any residual contaminants in the filtered water. In such an instance, remaining concentrations of ozone and/or individual resultant compounds can be decreased to levels that do not require special handling considerations while also adding more oxidizing potential.

Further, any suspended iron-oxy-hydroxide particulates remaining in the filtered water can also become catalytic surfaces for hydroperoxide formation from ozone. Accordingly, including UV sources in water treatment system 400 not only can provide disinfection of filtered water, but can also aid in decreasing or eliminating any residual ozone and removing any residual contaminants at the same time.

In summary, the UV energy of water treatment system 400 can decrease residual oxidizing agents in the filtered water, decrease contaminant levels in the filtered water, and/or disinfect the filtered water. These functions can be achieved more effectively and with a lower overall degree of complexity than previous designs. The discussion of FIG. 4 is directed to a configuration where the UV sources are positioned in region 172. However, the skilled artisan should recognize that these concepts can be applied to other configurations such as those described in relation to FIGS. 2-3. Still other applicable configurations can position the UV sources proximate to, but outside of the vessel 102, and within washbox 118, among others.

Figure 5:
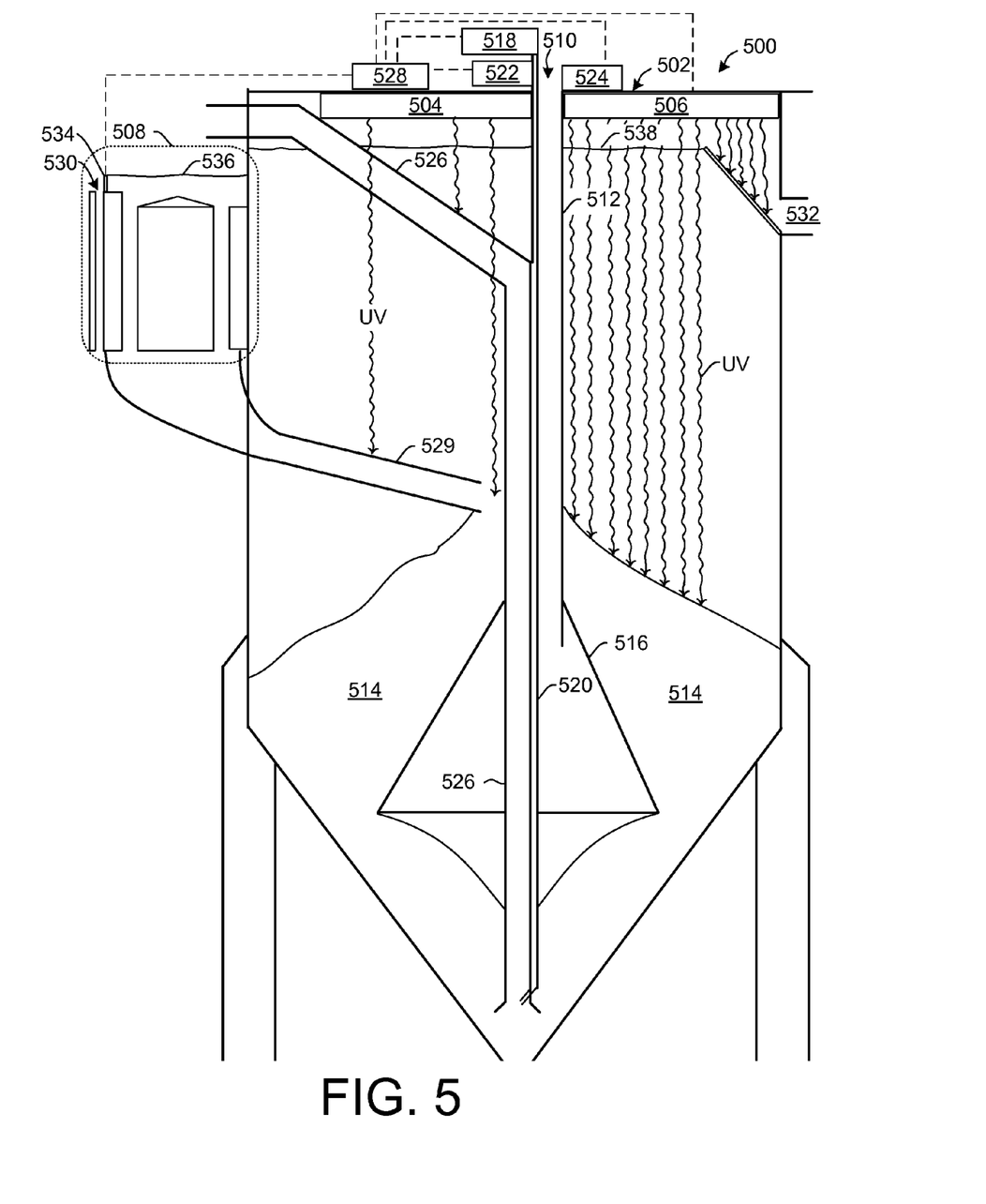

FIG. 5 shows a further water treatment system 500. This water treatment system includes a vessel 502 that has two UV sources 504, 506. In this case, the vessel 502 is associated with a washbox 508 that is external to the vessel. The vessel receives contaminated water 510 for treatment through an inlet pipe 512. Vessel 502 contains a media bed 514 for filtering contaminants and/or solids from contaminated water. Inlet pipe 512 extends down into vessel 502 to discharge the contaminated water into a central portion of media bed 514 through a distribution mechanism 516.

System 500 also includes a compressor 518, an air delivery mechanism 520, an airflow sensor 522, a water flow and/or water sensor 524, a recirculation tube 526, and a controller 528. The water sensor 524 can measure one or both of a rate at which water 510 is delivered to system 500 and/or a turbidity of the delivered water.

The air delivery mechanism 520 delivers air from compressor 518 to recirculation tube 526 proximate to a bottom of media bed 514. The airflow sensor 522 senses a rate at which the compressed air is delivered to the media bed. The recirculation tube 526 extends upwardly from the bottom of media bed 514 and out through an upper portion of vessel 502 to supply air, contaminants, solids, water, and media to the washbox 508. A relatively faster delivery rate of compressed air to the recirculation tube tends to increase a rate at which the contaminants, solids, water, and media are picked up from the media bed and carried to the washbox 508. Conversely, a relatively slower delivery rate of compressed air to the recirculation tube tends to decrease a rate at which the contaminants, solids, water, and media are picked up from the media bed and carried to the washbox.

Media delivered to washbox 508 falls downwardly and is exposed to a counter-current (i.e., generally opposite direction to the media pathway) of water that separates contaminants and solids from the media. The media that passes through the washbox is returned to vessel 502 via media inlet 529 to be recycled onto the media bed 514. A relatively concentrated stream of rejects that includes water, contaminants and/or solids exits the system via reject outlet 530. Filtered water exits via effluent outlet 532. A weir 534 determines a water level 536 above the washbox 508 relative to a water level 538 within vessel 502.

In this case, rather than being positioned in the filtered water as described in relation to FIGS. 1-4, UV sources 504 and 506 are positioned above the filtered water. UV energy from the UV sources can be directed into the filtered water to disinfect the filtered water, promote the formation of oxidative pathways from any oxidants, and/or disinfect media and/or surfaces of vessel 502. In this case, the UV sources are configured to emit and/or deliver different energy concentrations to different parts of system 500. For instance, in this implementation, UV source 506 is delivering a relatively higher energy concentration as indicated by a number of represented UV waves per unit area than UV source 504. Such a configuration can be useful, for instance, where UV source 504 provides UV energy to inhibit biological growth on media and/or inner surfaces of the vessel. UV source 506 can also inhibit biological growth on media and/or inner surfaces of the vessel. Further, UV source 506 can provide greater UV exposure to filtered water flowing to effluent outlet 532 to more effectively disinfect the effluent water.

In this implementation, controller 528 can control functioning of compressor 518, weir 534, and/or UV sources 504, 506. For instance, the controller can receive operating parameter values from airflow sensor 522 and/or water sensor 524. For instance, assume for purposes of explanation that the water flow sensor indicates an increased water flow rate into vessel 502. An increased water inflow rate can translate into decreased water retention times in vessel 502. Responsively, the controller can increase the UV energy output of one or both of UV sources 504, 506. The increased UV energy can contribute to adequately disinfecting the filtered water in light of the decreased retention time. The skilled artisan should recognize other scenarios that can be addressed by controller 528.

Exemplary Method

Figure 6:
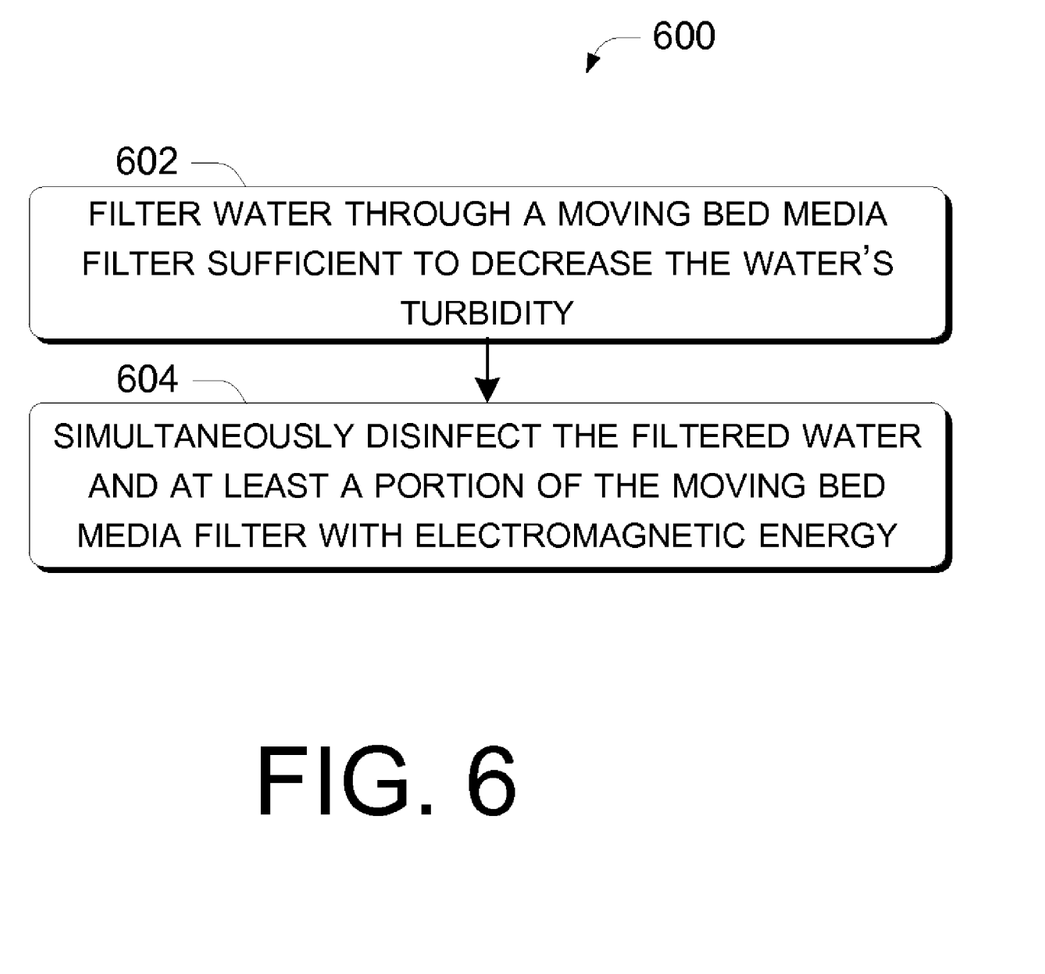
FIG. 6 is a flow diagram of an exemplary method for treating water in accordance with some implementations of the present concepts.

FIG. 6 shows an exemplary process or method 600 for treating water. The order in which the method 600 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device (such as controller 28 described above in relation to FIG. 5) causes the computing device to perform the method.

At block 602, water is filtered through a moving bed media filter sufficient to decrease the water's turbidity. For instance, the water may have a relatively high turbidity due to contaminant and/or solid loading, among others, before being filtered. The filtering can serve to decrease the turbidity by removing some or all of the contaminant and/or solid load from the water. In some cases, reagent(s) and/or oxidizer(s) can be introduced into contaminated or waste water to increase the efficacy of the filtering. Introducing the reagent and the oxidizer can facilitate creation of renewable catalytic oxidizing media within the moving bed media filter. The catalytic oxidizing media can remove contaminants from the waste water utilizing multiple destructive oxidation pathways.

In some of these cases, the amount of reagent and/or the oxidizer can be selectively dosed so that little or none of the reagent and oxidizer remain in the filtered water. In other cases, the dosing can be adjusted effective that filtered water emerges from the media bed containing excess reagent and/or excess oxidizer and/or derivatives thereof. For instance, where ozone is selected as the oxidizer, ozone and/or derivatives thereof such as superoxide, hydroxyl radicals and peroxide may remain in the filtered water.

At block 604, the filtered water and at least a portion of the moving bed media filter can be simultaneously disinfected with electromagnetic energy, such as ultra violet (UV) energy. Other implementations can employ other types of energy such as ultrasonic energy for the disinfection. For instance, the filtered water can be energized as the water emerges from the moving bed media filter so that at least some of the media is also energized. Energizing the media can disinfect the media and/or inhibit biological growth on the media. Alternatively or additionally, the energizing can promote chemical reactions on the media. For instance, energizing the filter media can promote formation of reactive catalytic and/or oxidative surfaces on the media that can remove contaminants from water passing through the media bed. In some cases, the energizing can alternatively or additionally serve to inhibit growth of organisms on surfaces of a mechanism that contains the water and/or media.

In some implementations the electromagnetic energy can interact with oxidizer(s) in the filtered water to promote formation of different oxidative pathways from the original oxidizer. For instance, where excess oxidizer remains in the filtered water, UV electromagnetic energy can convert at least some of the excess oxidizer to one or more of: superoxide, hydroxyl radicals, and peroxide. As mentioned above, in some configurations the formation of oxidation pathways can be promoted within the media bed. In such instances, the UV energy can further promote, in the filtered water, the same oxidative pathways and/or different (i.e., additional) oxidative pathways than those formed in the media bed. In summary, the UV energy can promote the effectiveness of any added oxidizers, such as ozone by creating multiple destructive pathways from the oxidizer, while at the same time decreasing any residual concentrations of the oxidizer that may otherwise damage (i.e., corrode) downstream components. The varied oxidizers can augment the direct disinfection associated with the UV energy on organisms in the filtered water to further treat the water.

Beyond disinfection, the UV energy can further enhance the safety of the treated water. For instance, in some cases a secondary disinfectant can be added to the treated water at some downstream point to provide residual disinfection of the water. For example, chlorine can be employed as a secondary disinfectant. However, chlorine can form halogenated disinfection byproducts (DPBs) from organic molecules in the treated water. In some cases, the use of ozone in water treatment has been known to increase concentrations of these organic molecules. However, in the present implementations, the UV energy in combination with the oxidative pathways that the UV energy promotes can break organic molecules down into constituent inorganic molecules. The inorganic molecules are not involved in the formation of DPBs. Described another way, the addition of oxidizers in previous solutions, aided one problem (e.g., disinfecting water) but could unintentionally create another problem (e.g., the formation of organic molecules that could subsequently be converted into potentially carcinogenic DPBs). The present implementations can augment the former disinfection function and decrease the occurrence of organic molecules that can be converted into DPBs. Accordingly, the present implementations that employ UV energy in combination with one or more oxidizers can achieve water treatment results that can offer multiple potential advantages over existing technologies.

While specific acts relating to water treatment are described above, other implementations may be directed to causing these or other acts to occur. For instance, a computer readable storage media may include instructions that when executed cause the above described filtering and disinfecting to occur, such as by controlling various water processing mechanisms.

CONCLUSION

Although exemplary techniques, methods, devices, systems, etc., relating to water processing have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A method, comprising:
introducing at least one metal salt and at least one oxidizer into contaminated water;
filtering the contaminated water through a moving media bed effective that filtered water emerges from the media bed containing excess metal salt and excess oxidizer and less contaminants, wherein the filtering comprises:
flowing the water in a direction that is generally opposite to movement of media in the media bed, and
recycling cleaned media back onto the media bed so that the filtered water emerges from the cleaned media; and,
exposing the filtered water to electromagnetic energy, wherein the exposing is sufficient to convert at least some of the excess oxidizer to one or more of: superoxide, hydroxyl radicals, and peroxide and to at least partially disinfect the filtered water, and wherein the exposing is sufficient to disinfect recycled cleaned media as the recycled cleaned media moves toward the media bed.

2. The method of claim 1, wherein the introducing comprises introducing the at least one metal salt and the at least one oxidizer into the contaminated water before the contaminated water reaches the media bed.

3. A system, comprising:

a vessel to contain a media bed such that contaminated fluid is introduced into the media bed and filtered fluid emerges from the media bed; and, an ultra violet (UV) energy source positioned proximate the vessel for emitting UV energy into the filtered fluid to at least partially disinfect the filtered fluid wherein the vessel further includes a washbox that functions to clean media withdrawn from the media bed and to recycle the cleaned media back to the media bed and wherein the cleaned media is exposed to the UV energy as the cleaned media falls from the washbox through the filtered fluid toward the media bed.

4. The system of claim 3 further comprising a mechanism for introducing ozone into the contaminated fluid and wherein the UV energy decreases ozone concentrations in the filtered fluid.

* * * * *